UNITED STATES PATENT OFFICE.

PAUL JULIUS AND ERNST FUSSENEGGER, OF LUDWIGSHAFEN-ON-THE-RHINE, AND LOUIS BLANGEY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

AZO DYE AND PROCESS OF MAKING SAME.

No. 921,546.　　　Specification of Letters Patent.　　　Patented May 11, 1909.

Application filed January 27, 1909. Serial No. 474,450.

To all whom it may concern:

Be it known that we, PAUL JULIUS, ERNST FUSSENEGGER, and LOUIS BLANGEY, doctors of philosophy and chemists, the first two subjects of the Emperor of Austria and the latter a citizen of the Swiss Republic, residing the two first at Ludwigshafen-on-the-Rhine and the latter at Mannheim, Germany, have invented new and useful Improvements in Azo Dyes and Processes of Making the Same, of which the following is a specification.

We have discovered that derivatives of ortho-nitranilin which contain either chlorin, or a methyl group, in each of positions 4 and 5 (thus, for instance, 4-methyl-5-chlor-2-nitranilin, 4-chlor-5-methyl-2-nitranilin, and 4.5-dichlor-2-nitranilin on being diazotized and combined with beta-naphthol give rise to coloring matters which are of great value as pigments. In particular, their lakes possess excellent fastness against the action of light and heat, and are insoluble in oil. The combination of the diazotized base with beta-naphthol is preferably carried out in the presence of an excess of acetate and, if desired, Turkey red oil, oleic acid, or soap, may be present and the reaction may be made to take place in the presence of a substratum such as heavy spar.

The 4-chlor-5-methyl-2-nitranilin used in this invention is new and is obtainable by nitrating 2-chlor-5-acet-toluid and saponifying the resulting nitro compounds. Any 4-chlor-5-methyl-6-nitranilin formed at the same time can be easily separated, as it is much more easily soluble in alcohol than is the 4-chlor-5-methyl-2-nitranilin. This 4-chlor-5-methyl-2-nitranilin consists of yellowish brown prisms which melt at about 159° C.

The derivatives of ortho-nitranilin which we use according to our invention can be represented by the general formula—

where X and Y may each represent either chlorin or methyl.

The coloring matters produced according to our invention possess orange-red shades, are insoluble in water and in dilute acids and alkalies, and upon reduction with tin and hydrochloric acid yield 1-amino-2-naphthol and a 1.2-diamino-benzol derivative possessing a constitution represented by the general formula—

where X and Y may each represent either chlorin or methyl.

The following examples will serve to illustrate further the nature of our invention, which, however, is not confined to these examples. The parts are by weight.

Example 1: Introduce twenty and seven-tenths parts of 4.5-dichlor-2-nitranilin into a solution of seven parts of sodium nitrite in one hundred parts of concentrated sulfuric acid, and, when diazotization is complete, pour the mixture on two hundred parts of ice, filter the solution, if necessary, and allow it to run, while well stirring, into a freshly prepared suspension of fifteen parts of beta-naphthol. When the combination is complete, filter off the coloring matter, and wash it.

Example 2: Diazotize thirty-seven and one-half parts of 4-methyl-5-chlor-2-nitranilin in the usual way, filter the diazo solution, if necessary, and allow it to run, while stirring well and at a temperature of zero centigrade, into an aqueous suspension of twenty-nine parts of beta-naphthol to which an excess of sodium acetate has been added. The suspension is preferably prepared by dissolving the beta-naphthol in caustic soda solution and precipitating it by means of acetic acid. When the combination is complete, filter off the coloring matter and wash it. In a similar manner 4-chlor-5-methyl-2-nitranilin can be made to yield the corresponding coloring matter.

Now what we claim is:—

1. The process of making azo coloring matter by combining with beta-naphthol a diazotized ortho-nitranilin derivative possessing a constitution represented by the hereinbefore defined formula

2. The process of making azo coloring matter by combining diazotized 4.5-dichlor-2-nitranilin with beta-naphthol.

3. As new articles of manufacture the coloring matters which can be obtained by combining with beta-naphthol a diazotized ortho-nitranilin derivative possessing a constitution represented by the hereinbefore defined formula

which coloring matters possess orange-red shades, are insoluble in water and in dilute acids and alkalies, and upon reduction with tin and hydrochloric acid yield 1-amino-2-naphthol and a 1.2-diamino-benzol derivative possessing a constitution represented by the hereinbefore defined formula

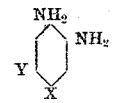

4. As a new article of manufacture the coloring matter which can be obtained by combining diazotized 4.5-dichlor-2-nitranilin with beta-naphthol, which coloring matter possesses an orange-red shade, is insoluble in water and in dilute acids and alkalies, and upon reduction with tin and hydrochloric acid yields 1-amino-2-naphthol and 4.5-dichlor-2-nitranilin.

In testimony whereof we have hereunto set our hands in the presence of two subscribing witnesses.

PAUL JULIUS.
ERNST FUSSENEGGER.
LOUIS BLANGEY.

Witnesses:
J. ALEC. LLOYD,
TERESA CATTARANI.